United States Patent
Masuko et al.

(10) Patent No.: US 9,926,475 B2
(45) Date of Patent: Mar. 27, 2018

(54) RESIN COMPOSITION, ADHESIVE TAPE, AND METHOD FOR PRODUCING ADHESIVE TAPE

(71) Applicant: DEXERIALS CORPORATION, Tokyo (JP)

(72) Inventors: Daisuke Masuko, Tokyo (JP); Takayuki Matsushima, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 16 days.

(21) Appl. No.: 14/765,663

(22) PCT Filed: Jan. 28, 2014

(86) PCT No.: PCT/JP2014/051782
§ 371 (c)(1),
(2) Date: Aug. 4, 2015

(87) PCT Pub. No.: WO2014/123034
PCT Pub. Date: Aug. 14, 2014

(65) Prior Publication Data
US 2015/0376470 A1     Dec. 31, 2015

(30) Foreign Application Priority Data

Feb. 8, 2013   (JP) ................................. 2013-023170

(51) Int. Cl.
*C09J 7/02*       (2006.01)
*C09J 11/08*      (2006.01)
(Continued)

(52) U.S. Cl.
CPC ............ *C09J 133/08* (2013.01); *B05D 3/067* (2013.01); *B05D 7/54* (2013.01); *C08F 2/44* (2013.01);
(Continued)

(58) Field of Classification Search
None
See application file for complete search history.

(56) References Cited

U.S. PATENT DOCUMENTS 4,916,172 A * 4/1990 Hayashi ................ C04B 24/003
                                                    523/171
6,558,753 B1 * 5/2003 Ylitalo ................. C09D 11/36
                                                    427/466
(Continued)

FOREIGN PATENT DOCUMENTS

JP    H04-63870 A    2/1992
JP    H06-214385 A   8/1994
(Continued)

OTHER PUBLICATIONS

May 13, 2014 International Search Report issued in International Patent Application No. PCT/JP2014/051782.

*Primary Examiner* — Frank D Ducheneaux
(74) *Attorney, Agent, or Firm* — Oliff PLC

(57) ABSTRACT

The invention provides a resin composition capable of achieving excellent chromaticity and a sufficient degree of cure, an adhesive tape, and a method for producing an adhesive tape. The adhesive tape has at least one layer formed by making a resin composition undergo a polymerization reaction, the adhesive composition including: an acrylic monomer; a photopolymerization initiator; and a coloring agent which has a mean volume particle diameter of not less than 1 μm and not more than 20 μm and in which a pigment is encapsulated in a resin, in which the coloring agent is contained so that the pigment content is not less than 0.25 wt % and not more than 1.0 wt %. This allows aggregation of the coloring agent to be prevented and inhibition of the polymerization reaction to be prevented, and therefore, excellent chromaticity and a sufficient degree of cure can be achieved.

13 Claims, 2 Drawing Sheets

(51) Int. Cl.
*C09J 133/08* (2006.01)
*C09J 175/04* (2006.01)
*C08L 33/02* (2006.01)
*C08K 3/04* (2006.01)
*C08K 9/10* (2006.01)
*C08F 2/48* (2006.01)
*C08F 2/44* (2006.01)
*C09J 4/06* (2006.01)
*B05D 3/06* (2006.01)
*B05D 7/00* (2006.01)

(52) U.S. Cl.
CPC ............ *C08F 2/48* (2013.01); *C08L 33/02* (2013.01); *C09J 4/06* (2013.01); *C09J 7/02* (2013.01); *C09J 7/0217* (2013.01); *C09J 11/08* (2013.01); *C09J 175/04* (2013.01); C08K 3/04 (2013.01); C08K 9/10 (2013.01); C08L 2312/06 (2013.01); C08L 2666/70 (2013.01); C09J 2205/102 (2013.01); *C09J 2205/31* (2013.01)

(56) References Cited

U.S. PATENT DOCUMENTS

| | | | |
|---|---|---|---|
| 2009/0004423 | A1 | 1/2009 | Dietz |
| 2011/0257273 | A1* | 10/2011 | Yabuuchi ............ C08G 18/4063 514/772.3 |
| 2012/0287213 | A1* | 11/2012 | Engel ................... C09D 11/101 347/102 |

FOREIGN PATENT DOCUMENTS

| | | |
|---|---|---|
| JP | H06-346040 A | 12/1994 |
| JP | 2002-249678 A | 9/2002 |
| JP | 2005-068381 A | 3/2005 |
| JP | 2008-531824 A | 8/2008 |
| WO | 2012/156204 A1 | 11/2012 |
| WO | 2014/119042 A1 | 8/2014 |

\* cited by examiner

RESIN COMPOSITION, ADHESIVE TAPE, AND METHOD FOR PRODUCING ADHESIVE TAPE

FIELD OF THE INVENTION

The present invention relates to a resin composition colored with a pigment, an adhesive tape, and a method for producing an adhesive tape. The present application claims priority based on Japanese Patent Application No. 2013-023170 filed in Japan on Feb. 8, 2013. The total contents of the patent application are to be incorporated by reference into the present application.

BACKGROUND ART

As a general-purpose adhesive tape, for example, a product colored black has been widely used for design qualities and light blocking effects.

As a technique for black coloring, a method of mixing a coloring agent, such as carbon black, in an adhesive component has been commonly employed. This method is such that an adhesive is dissolved in a solvent, then, a coloring agent is added thereto, and applied to a base material and heated to volatilize the solvent, whereby a film is formed, and this method is applied to a method for producing what is called a solvent-type adhesive tape.

However, in a production method by which a monomer is applied to a base material and then irradiated by an active energy ray, whereby the monomer is polymerized to be made into an adhesive, sometimes the active energy ray is shielded or absorbed by a coloring agent such as carbon black, whereby the active energy ray is inhibited from reaching the monomer and a polymerization initiator. Furthermore, sometimes, a functional group, such as a hydroxyl group or a carboxyl group, which is present in the surface of carbon black or the like deactivates a reaction growth site formed by an active energy ray, whereby a polymerization reaction of the monomer is inhibited.

Patent document 1 discloses that colored plastic beads are employed for a pressure-sensitive adhesive layer which is produced by polymerizing a monomer by an active energy ray, but, with a technique disclosed in Patent document 1, it is difficult to achieve excellent chromaticity and a sufficient degree of cure.

PRIOR-ART DOCUMENTS

Patent Document

Patent document 1: Japanese Patent Application Laid-Open No. H06-346040

SUMMARY OF THE INVENTION

Problems to be Solved by the Invention

The present invention is proposed in view of such conventional actual circumstances, and provides a resin composition capable of achieving excellent chromaticity and a sufficient degree of cure, an adhesive tape, and a method for producing an adhesive tape.

Means to Solve the Problems

The present inventors earnestly studied, and consequently found that the foregoing object can be achieved by using a coloring agent in which a pigment is encapsulated in a resin and controlling a particle diameter of the coloring agent and the pigment content of a resin composition to be within the respective predetermined ranges, and thus the inventors accomplished the present invention.

That is, a resin composition according to the present invention includes: an acrylic monomer; a photopolymerization initiator; and a coloring agent which has a mean volume particle diameter of not less than 1 μm and not more than 20 μm and in which a pigment is encapsulated in a resin, in which the coloring agent is contained so that the amount of the pigment contained is not less than 0.25 wt % and not more than 1.0 wt %.

An adhesive tape according to the present invention has at least one layer which is formed by making a resin composition undergo a polymerization reaction, the resin composition including: an acrylic monomer; a photopolymerization initiator; and a coloring agent which has a mean volume particle diameter of not less than 1 μm and not more than 20 μm and in which a pigment is encapsulated in a resin, in which the coloring agent is contained so that the amount of the pigment contained is not less than 0.25 wt % and not more than 1.0 wt %.

A method for producing an adhesive tape according to the present invention includes the steps of: applying a resin composition onto a base material, the resin composition including an acrylic monomer, a photopolymerization initiator, and a coloring agent which has a mean volume particle diameter of not less than 1 μm and not more than 20 μm and in which a pigment is encapsulated in a resin, in which the coloring agent is contained so that the amount of the pigment contained is not less than 0.25 wt % and not more than 1.0 wt %; and forming an adhesive layer on the base material by irradiating the resin composition with an active energy ray.

A method for producing an adhesive tape according to the present invention includes the steps of: forming an adhesive layer on a release material; applying a resin composition onto the adhesive layer, the resin composition including an acrylic monomer, a photopolymerization initiator, and a coloring agent which has a mean volume particle diameter of not less than 1 μm and not more than 20 μm and in which a pigment is encapsulated in a resin, in which the coloring agent is contained so that the amount of the pigment contained is not less than 0.25 wt % and not more than 1.0 wt %; and forming a base material layer on the adhesive layer formed on the release material by irradiating the resin composition with an active energy ray.

Effects of the Invention

According to the present invention, the mean volume particle diameter of the coloring agent in which a pigment is encapsulated in a resin is within a predetermined range, and the coloring agent is contained so that the pigment content of the resin composition is within a predetermined range, whereby aggregation of the coloring agent can be prevented and inhibition of a polymerization reaction can be prevented. This allows an adhesive layer having excellent chromaticity and a sufficient degree of cure to be achieved.

DETAILED DESCRIPTION OF THE INVENTION

Figure 1:
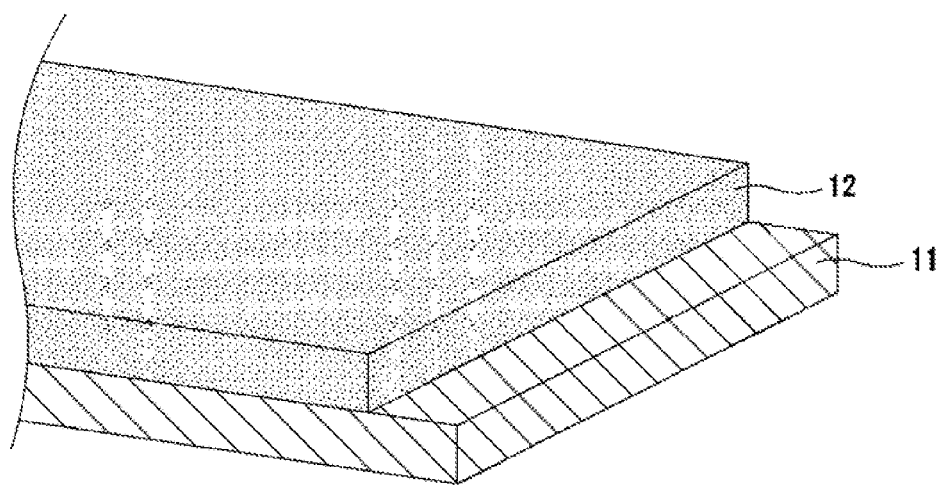
FIG. 1 is a cross-sectional view illustrating an example of a single-sided adhesive tape according to one embodiment of the present invention.

Hereinafter, with reference to the drawings, embodiments of the present invention will be described in detail in the following order.

1. Resin composition
2. Adhesive tape and producing method therefor
3. Examples

<1. Resin Composition>

A resin composition as one embodiment of the present invention includes an acrylic monomer, a photopolymerization initiator, and a coloring agent which has a mean volume particle diameter of not less than 1 μm and not more than 20 μm and in which a pigment is encapsulated in a resin, in which the coloring agent is contained so that the pigment content is not less than 0.25 wt % and not more than 1.0 wt %.

The acrylic monomer is a radical polymerizable acrylic monomer, such as (meth)acrylic ester ((meth)acrylate) or (meth)acrylic acid. Here, the (meth)acrylic acid implies to include acrylic acid and methacrylic acid. Likewise, the (meth)acrylate implies to include acrylate and methacrylate.

As the acrylic monomer, it is preferable to use a partially polymerized substance of a (meth)acrylic acid alkyl ester and a monomer capable of being copolymerized with the (meth)acrylic acid alkyl ester, or to use these monomers in combination.

Examples of the alkyl(meth)acrylate include 2-ethylhexyl (meth)acrylate, (meta)butyl(meth)acrylate, isoamyl(meth)acrylate, nonyl(meth)acrylate, isononyl(meth)acrylate, isooctyl(meth)acrylate, lauryl(meth)acrylate, and decyl (meth)acrylate, and at least one kind of these may be used.

Examples of the monomer capable of being copolymerized with the (meth)acrylic acid alkyl ester include (meth)acrylic acid, N-vinyl pyrrolidone, itaconic acid, tetrahydrofurfuryl acrylate, ethyl(meth)acrylate, 2-hydroxyethyl (meth)acrylate, 2-hydroxypropyl(meth)acrylate, isobornyl (meth)acrylate, ethoxyethyl(meth)acrylate, butoxyethyl (meth)acrylate, phenoxyethyl(meth)acrylate, phenyl(meth)acrylate, and cyclohexyl(meth)acrylate, and at least one kind of these may be used.

The amount of the acrylic monomer contained is preferably not less than 60 wt %. Furthermore, the blending ratio of a monomer capable of being copolymerized with a (meth)acrylic acid alkyl ester to the (meth)acrylic acid alkyl ester is preferably from 1 to 20 parts by mass of the copolymerizable monomer with respect to 100 parts by mass of the (meth)acrylic acid alkyl ester.

As the photopolymerization initiator, there may be used a common radical type photopolymerization initiator or a common cation type photopolymerization initiator, each of which forms a free radical by irradiation with an active energy ray. Examples of the photopolymerization initiator include: acyl phosphine oxide-based photopolymerization initiators, such as 2,4,6-trimethylbenzoyl-diphenyl-phosphine oxide, 4-(2-hydroxyethoxyl)phenyl(2-hydroxy-2-propyl)ketone, and bis(2,4,6-trimethylbenzoyl)-phenyl phosphine oxide; acetophenone-based photopolymerization initiators, such as α-hydroxy-α,α'-dimethylacetophenone, methoxy acetophenone, 2,2-dimethoxy-2-phenylacetone, and 2-hydroxy-2-cyclohexylacetophenone; ketal-based photopolymerization initiators, such as benzyl dimethyl ketal; and other photopolymerization initiators, such as ketone halide and acylphosphonate. These photopolymerization initiators may be used alone, or two or more kinds of these may be used in combination.

A too small amount of the photopolymerization initiator contained tends to cause inhibition of a polymerization reaction, on the contrary, a too large amount of the photopolymerization initiator contained tends to lead to a lower weight-average molecular weight of a polymer obtained by a polymerization reaction, and hence, the amount of the photopolymerization initiator contained is preferably 0.005 to 2 parts by mass with respect to 100 parts by mass of the acrylic monomer.

The coloring agent is formed of resin particles in each of which a pigment is encapsulated. The use of resin particles in each of which a pigment is encapsulated enables prevention of a contact between a functional group which is present in the surface of the pigment and inhibits a curing reaction and a composition which is curable by an active energy ray, whereby the amount of time required for curing by an active energy ray can be considerably reduced. Furthermore, in the case where a pigment is directly added to a resin composition, when the pigment has a small diameter, an aggregate thereof tends to be easily formed, thereby causing difficulties in dispersion of the pigment, but, the pigment-encapsulated resin particles according to the present technique is such that a pigment is encapsulated in a resin having a larger diameter, and therefore, the occurrence of aggregation is not easily caused, whereby the pigment can be easily dispersed.

The resin in which the pigment is encapsulated is preferably urethane resin or acrylic resin. Urethane resin and acrylic resin are excellent in transparency and processability, and capable of preventing a curing reaction by an active energy ray from being inhibited.

As the pigment, there may be used a common inorganic pigment, a common organic pigment, or the like, but, in the present embodiment, as a color tone used for coloring, black, which has a high effect of light blocking, is preferable, and furthermore, as a black pigment, carbon black, which has a high effect of black coloring and a cost advantage, is preferably used.

Specifically, the coloring agent preferably includes resin particles made of urethane resin or acrylic resin and including 5 to 40 wt % of carbon black encapsulated therein. This allows a satisfactory black color to be achieved without great inhibition of active energy ray curing.

The coloring agent has a mean volume particle diameter of preferably not less than 1 μm and not more than 20 μm, more preferably not less than 2 μm and not more than 15 μm. A coloring agent having a mean volume particle diameter of less than 1 μm causes an increase in aggregates in the composition, whereby the dispersion tends to be difficult, and, on the contrary, a coloring agent having a mean volume particle diameter of more than 20 μm causes an increase in voids between colored particles in a formulation, whereby coloring performance tends to be decreased. It should be noted that a mean volume particle diameter (MV) indicates a mean diameter for which volume weighting is implemented.

The amount of the coloring agent contained is such that the pigment content of the resin composition is preferably not less than 0.25 wt % and not more than 1.0 wt %, more preferably not less than 0.3 wt % and not more than 0.8 wt %. In the case where the pigment content of the resin composition is less than 0.25 wt %, coloring performance tends to be insufficient, and on the contrary, in the case where the pigment content of the resin composition is more than 1.0 wt %, any further improvement in coloring performance cannot be brought, and besides, only light blocking effects are increased, and curing of the resin composition tends to be difficult. It should be noted that the pigment content of the resin composition is expressed by the following equation (1).

Pigment content of resin composition(wt %)=percentage of pigment content of coloring agent(wt %)×percentage of coloring agent added to resin composition(wt %)     (1)

Furthermore, the amount of the coloring agent contained is preferably not less than 1 wt % and not more than 10 wt %, more preferably not less than 2 wt % and not more than 8 wt %. In the case where the amount of the coloring agent contained is less than 1 wt %, coloring performance tends to be insufficient, on the contrary, in the case where the amount of the coloring agent contained is more than 10 wt %, there are tendencies for viscosity to greatly increase and for dispersion to be difficult.

Furthermore, as other additives, a cross-linking agent, hollow particles, an inorganic filler, a softener, a tackifier, a coupling agent, an antioxidant, a flame retarder, and the like may be blended in, according to the usage. As the cross linking agent, multifunctional(meth)acrylate, a multifunctional epoxy compound, a multifunctional isocyanate compound, or the like may be used. As the hollow particles, glass beads, plastic beads, or the like may be used.

The resin composition having such configuration can be used as a solventless type which does not require an organic solvent. In the resin composition in the present embodiment, the mean volume particle diameter of the coloring agent in which a pigment is encapsulated in a resin is within a predetermined range, and the coloring agent is contained so that the pigment content of the resin composition is within a predetermined range, whereby aggregation of the coloring agent can be prevented and inhibition of a polymerization reaction can be prevented. This allows an adhesive layer or a base material layer each having excellent chromaticity and a sufficient degree of cure to be achieved.

<2. Adhesive Tape and Producing Method Therefor>

Next, an adhesive tape produced by using the foregoing adhesive composition will be described. The adhesive tape in the present embodiment has at least one layer which is formed by making a resin composition undergo a polymerization reaction, the resin composition including: an acrylic monomer; a photopolymerization initiator; and a coloring agent which has a mean volume particle diameter of not less than 1 μm and not more than 20 μm and in which a pigment is encapsulated in a resin, in which the coloring agent is contained so that the pigment content is not less than 0.25 wt % and not more than 1.0 wt %.

FIG. 1 is a cross-sectional view illustrating an example of a single-sided adhesive tape according to one embodiment of the present invention. This single-sided adhesive tape is formed by laminating a base material 11 and an adhesive layer 12 formed by curing the foregoing resin composition.

The base material 11 may be made of polyethylene terephthalate, polyester, polypropylene, or the like, and may be colored black, white, or the like. Furthermore, as the base material 11, there may be used a meltblown nonwoven fabric, a card nonwoven fabric, a spunbond nonwoven fabric, a spunlace nonwoven fabric, or the like, each being made of polyester, polypropylene, or the like.

The adhesive layer 12 is formed by irradiating the resin composition with an active energy ray to cause a polymerization reaction, and has a predetermined degree of tackiness.

Figure 2:
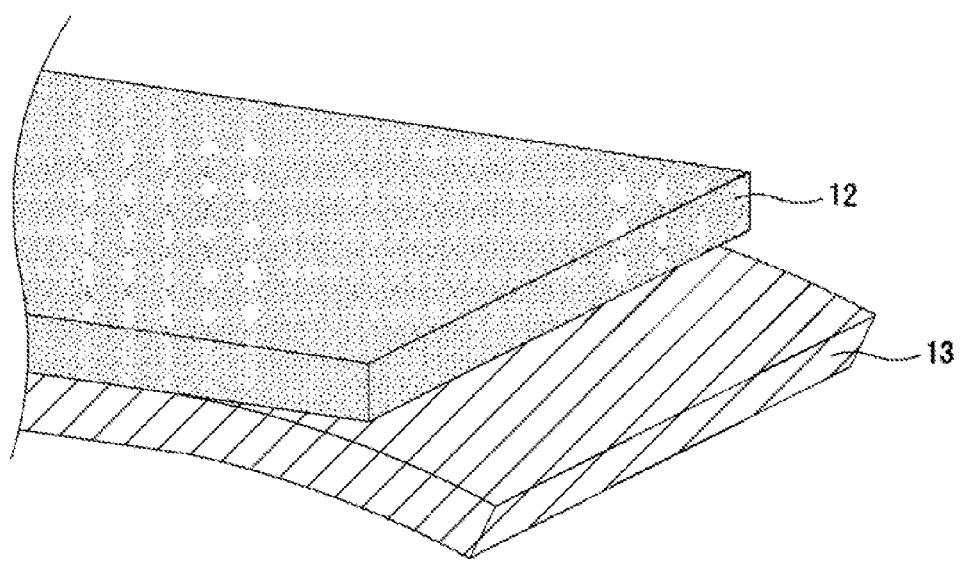
FIG. 2 is a cross-sectional view illustrating an example of a double-sided adhesive tape according to one embodiment of the present invention.

FIG. 2 is a cross-sectional view illustrating an example of a double-sided adhesive tape according to one embodiment of the present invention. This double-sided adhesive tape is formed by laminating a release material 13 and an adhesive layer 12 formed by curing the foregoing resin composition. It should be noted that the adhesive layer 12 illustrated in FIG. 2 is the same as the adhesive layer 12 illustrated in FIG. 1, and therefore, descriptions thereof will be omitted here.

As the release material 13, there may be used a common release film base-material, namely, a polyethylene terephthalate film, fine quality paper, or the like, to both sides of each of which a silicone release treatment is applied.

Figure 3:
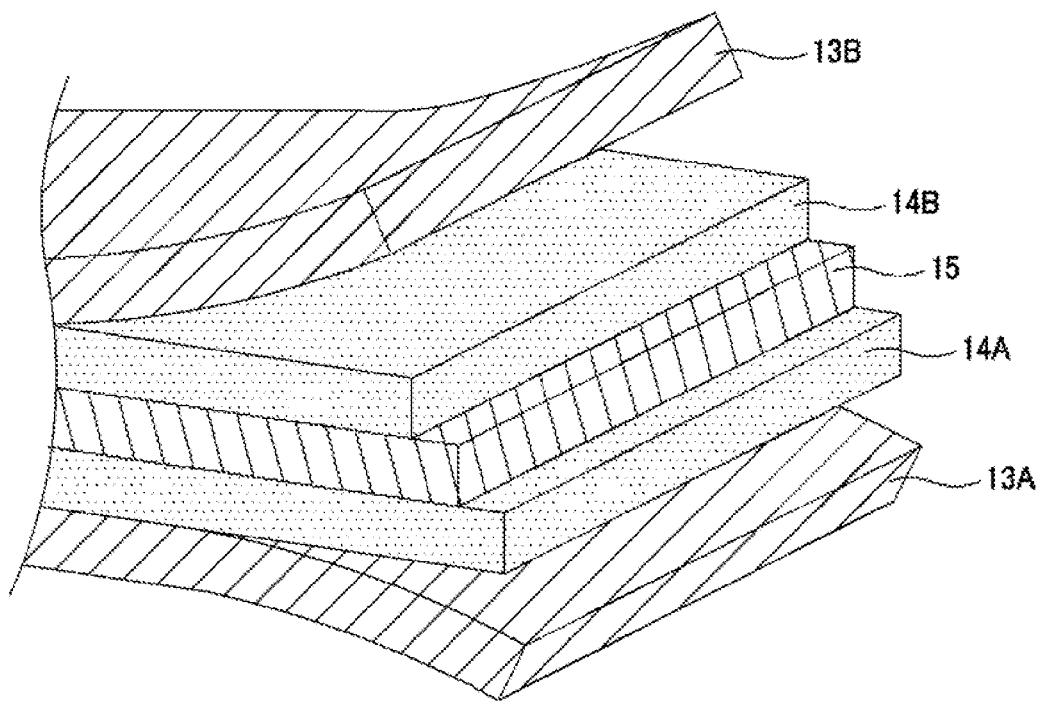
FIG. 3 is a cross-sectional view illustrating an example of a double-sided adhesive tape according to another embodiment of the present invention.

FIG. 3 is a cross-sectional view illustrating an example of a double-sided adhesive tape according to another embodiment of the present invention. This double-sided adhesive tape is such that an adhesive layer 14A is formed on a release material 13A, and a base material 15 including the foregoing resin composition is formed on the adhesive layer 14A, and furthermore, an adhesive layer 14B is formed on the base material 15. It should be noted that the release materials 13A and 13B illustrated in FIG. 3 each are the same as the release material 13 illustrated in FIG. 2, and therefore description thereof will be omitted here.

For the adhesive layer 14A and 14B, there may be employed a well-known method for producing an adhesive which is such that a material obtained by dissolving an acrylic resin composition cured by an active energy ray or a high polymer in a solvent is applied to a release paper and then dried to form an adhesive layer. The former, that is, the curing of the acrylic resin composition, may be performed simultaneously with the curing of the foregoing resin composition by an active energy ray. It should be noted that, as a configuration example of the double-sided tape illustrated in FIG. 3, there may be mentioned a single-sided tape in which the adhesive layer 14B is not formed.

In the adhesion layer or the base material of such adhesive tape, the coloring agent in which a pigment is encapsulated in a resin has a mean volume particle diameter within a predetermined range, and the coloring agent is contained so that the pigment content of the resin composition is within a predetermined range, and hence, excellent chromaticity and a sufficient degree of cure can be achieved.

Next, a method for producing the foregoing adhesive tape will be described. A first aspect of the method for producing the adhesive tape in the present embodiment includes the steps of: applying a resin composition onto a base material, the resin composition including an acrylic monomer, a photopolymerization initiator, and a coloring agent which has a mean volume particle diameter of not less than 1 μm and not more than 20 μm and in which a pigment is encapsulated in a resin, in which the coloring agent is contained so that the pigment content is not less than 0.25 wt % and not more than 1.0 wt %; and forming an adhesive layer on the base material by irradiating the resin composition with an active energy ray.

Here, an example of a method for producing the single-sided adhesive tape illustrated in FIG. 1 will be described. First, with a usual method, components which constitute the foregoing resin composition are mixed to prepare the resin composition, and uniformly applied onto a base material 11 by a coater or the like. The application thickness of the resin composition onto the base material 11 is preferably from 50 to 500 μm.

Next, an adhesive composition is irradiated with an active energy ray under inert gas atmosphere, such as nitrogen or argon, to be cured to form an adhesive layer, whereby a single-sided adhesive tape can be attained.

As the active energy ray, a well-known active energy source may be employed. From a viewpoint of making a production process simpler, an active energy source which effectively emits ultraviolet radiation is preferably employed. Examples of the light source include a carbon arc lamp, an ultra-high pressure mercury lamp, a high pressure mercury vapor lamp, a xenon lamp, a metal halide lamp, a fluorescent chemical lamp, or the like.

The double-sided adhesive tape illustrated in FIG. 2 can be obtained by using the release material 13 instead of the base material 11.

Furthermore, a second aspect of the method for producing the adhesive tape in the present embodiment includes the steps of: forming an adhesive layer on a release material; applying a resin composition onto the adhesive layer, the resin composition including an acrylic monomer, a photopolymerization initiator, and a coloring agent which has a mean volume particle diameter of not less than 1 μm and not more than 20 μm and in which a pigment is encapsulated in a resin, in which the coloring agent is contained so that the pigment content is not less than 0.25 wt % and not more than 1.0 wt %; and forming a base material layer on the adhesive layer formed on the release material by irradiating the resin composition with an active energy ray.

Specifically, to produce the double-sided adhesive tape illustrated in FIG. 3, the adhesive layer 14A is formed on the release material 13A, and furthermore, the foregoing resin composition is applied thereto to form the base material layer 15. Furthermore, the adhesion layer 14B is formed on another release material 13B, and the base material layer 15 and the adhesive layer 14B are pasted together, whereby the double-sided adhesive tape can be obtained. In this double-sided adhesive tape, before or after the base material layer 15 and the adhesive layer 14B are pasted together, the base material layer 15 is irradiated with an active energy ray from both sides or one side thereof, thereby being cured.

According to the method for producing the adhesive tape in the present embodiment, the use of the coloring agent in which a pigment is encapsulated in a resin allows the coloring agent to be uniformly dispersed in the resin composition, inhibition of a polymerization reaction to be prevented, and an adhesive layer or a base material layer, each having excellent chromaticity and a sufficient degree of cure, to be achieved.

EXAMPLES

<3. Examples>

Hereinafter, Examples of the present invention will be described in detail, but, the present invention is not limited to these Examples.

In the Examples, a resin composition containing a coloring agent was prepared, and then irradiated with an active energy ray to produce a cured product, and the degree of blackness of the cured product, the degree of cure of the cured product, and the presence of aggregation of the coloring agent in the resin composition were evaluated.

[Evaluation of Degree of Blackness]

As an item for evaluation of the degree of blackness, using a spectrocolorimeter conforming to JIS Z872 (CM2600d, manufactured by KONICA MINOLTA, INC.), the CIE L*a*b values of the cured product were measured, and the L value, which indicates lightness, was taken as a criterion of the degree of blackness. It should be noted that a and b values, which indicate hues of red and blue, respectively, were within a range of +/−2 in Examples and Comparative Examples, thereby having little effect, and therefore were omitted.

[Evaluation of Degree of Cure]

As an item for evaluation of the degree of cure, the volatilization amount of a residual monomer in the cured product was measured. The cured product was heated at 135 degrees C. for 10 minutes, and a loss in weight before and after the heating was measured, and the percentage of a loss in weight on heating was taken as the amount of an unreacted monomer (%).

[Presence of Aggregation]

The state of the resin composition after applied was examined by a microscope to visually examine the presence of aggregation of the coloring agent. A case where aggregation of the coloring agent was present was evaluated as x, and on the other hand, a case where aggregation of the coloring agent was absent was evaluated as ○.

[Evaluation of Appearance]

The cured product was visually examined to evaluate the color appearance thereof.

Example 1

Added were 95 parts by mass of a partially polymerized substance of acrylic acid and 2-ethylhexyl acrylate, 1 part by mass of a photo radical initiator (trade name: LUCIRIN TPO, manufactured by BASF S.E, 2,4,6-trimethylbenzoyl-diphenyl-phosphine oxide), and 4 parts by mass of a coloring agent (Art Pearl C800 Black, manufactured by Negami chemical industrial Co., Ltd, the mean volume particle diameter of 6.5 μm, urethane resin particles, the carbon black content of 7.5%), and agitated at 1200 rpm for 10 minutes by an agitator (Three-One Motor BL1200, manufactured by Shinto Scientific Co., Ltd.), whereby a composition was obtained.

Using a bar coater, the composition was applied to a white PET film having a thickness of 50 μm and having undergone a release treatment so that the composition had a thickness of 300 μm, and the composition was irradiated by a chemical lamp with a radiation intensity of 1 mw/cm$^2$ at 365 nm for 5 minutes under nitrogen atmosphere, and subsequently, irradiated by a metal halide lamp with the maximum radiation intensity of 50 mW/cm$^2$ so as to attain an integrated light quantity of 1000 mJ/cm$^2$, whereby a cured product of the resin composition was obtained.

As shown in Table 1, evaluation results were as follows: the degree of blackness (L value) of the cured product was 9.10; the loss in weight on heating of the cured product was 0.70%; the state of aggregation of the coloring agent in the resin composition was ○; and the color appearance of the cured product was black.

Example 2

The agitation, application and curing were performed in the same manner as in Example 1 to obtain a cured product, except that the coloring agent was changed to a coloring agent, Art Pearl GR-004BK (manufactured by Negami chemical industrial Co., Ltd, the mean volume particle diameter of 3.8 μm, acrylic resin particles, the carbon black content of 37%), the amount of coloring agent added was 2 parts by mass, and the amount of the partially polymerized substance of acrylic acid and 2-ethylhexyl acrylate added was 97 parts by mass.

As shown in Table 1, evaluation results were as follows: the degree of blackness (L value) of the cured product was 8.80; the amount of an unreacted monomer in the cured product was 0.75%; the state of aggregation of the coloring agent in the resin composition was ○; and the color appearance of the cured product was black.

Example 3

The agitation, application and curing were performed in the same manner as in Example 1 to obtain a cured product, except that the amount of coloring agent (Art Pearl C800 Black) added was 7 parts by mass, and the amount of the partially polymerized substance of acrylic acid and 2-ethylhexyl acrylate added was 92 parts by mass.

As shown in Table 1, evaluation results were as follows: the degree of blackness (L value) of the cured product was 8.50; the amount of an unreacted monomer in the cured product was 0.87%; the state of aggregation of the coloring agent in the resin composition was ○; and the color appearance of the cured product was black.

Example 4

The agitation, application and curing were performed in the same manner as in Example 1 to obtain a cured product, except that the coloring agent was changed to a coloring agent, RUBCOULEUR 224SM (manufactured by Dainichiseika Color & Chemicals Mfg. Co., Ltd., the mean volume particle diameter of 2.5 μm, acrylic resin particles, the carbon black content of 18%).

As shown in Table 1, evaluation results were as follows: the degree of blackness (L value) of the cured product was 8.92; the amount of an unreacted monomer in the cured product was 0.88%; the state of aggregation of the coloring agent in the resin composition was 0; and the color appearance of the cured product was black.

Example 5

The agitation, application and curing were performed in the same manner as in Example 1 to obtain a cured product, except that the coloring agent was changed to a coloring agent, Art Pearl G400BK (manufactured by Negami chemical industrial Co., Ltd, the mean volume particle diameter of 15 μm, acrylic resin particles, the carbon black content of 7.5%), the amount of coloring agent added was 7 parts by mass, and the amount of the partially polymerized substance of acrylic acid and 2-ethylhexyl acrylate added was 92 parts by mass.

Example 6

A composition obtained by removing the coloring agent from the composition of Example 1 was used as an uncolored composition. This uncolored composition was applied to a transparent PET film A having a thickness of 50 μm and having undergone a release treatment so that the uncolored composition had a thickness of 50 μm. Furthermore, the composition in Example 1 was applied onto the uncolored composition so as to have a thickness of 300 μm, and cured in the same manner as in Example 1. On the other hand, the uncolored composition was applied to another transparent PET film B having undergone a release treatment so as to have an application thickness of 50 μm, and cured in the same manner as in Example 1. After that, the PET film A to which the composition and the uncolored composition were applied and the PET film B to which the uncolored composition was applied were arranged so that the surfaces thereof each having the composition applied thereto faced each other, and the PET film A and the PET film B were pasted together as they were, whereby a double-sided tape was obtained.

As shown in Table 1, evaluation results were as follows: the degree of blackness (L value) of the cured product was 9.88; the amount of an unreacted monomer in the cured product was 0.92%; the state of aggregation of the coloring agent in the resin composition was ○; and the color appearance of the cured product was black.

Comparative Example 1

The agitation, application and curing were performed in the same manner as in Example 1 to obtain a cured product, except that the coloring agent was changed to a coloring agent, Art Pearl C300 Black (manufactured by Negami chemical industrial Co., Ltd, the mean volume particle diameter of 22 μm, urethane resin particles, the carbon black content of 3.5%).

As shown in Table 2, evaluation results were as follows: the degree of blackness (L value) of the cured product was 27.21; the amount of an unreacted monomer in the cured product was 0.63%; the state of aggregation of the coloring agent in the resin composition was ○; and the color appearance of the cured product was gray.

Comparative Example 2

The agitation, application and curing were performed in the same manner as in Example 1 to obtain a cured product, except that the coloring agent was changed to a coloring agent, Art Pearl C300 Black, the amount of the coloring agent added was 8 parts by mass, and the amount of the partially polymerized substance of acrylic acid and 2-ethylhexyl acrylate added was 91 parts by mass.

As shown in Table 2, evaluation results were as follows: the degree of blackness (L value) of the cured product was 22.35; the amount of an unreacted monomer in the cured product was 0.68%; the state of aggregation of the coloring agent in the resin composition was ○; and the color appearance of the cured product was gray.

Comparative Example 3

The agitation, application and curing were performed in the same manner as in Example 1 to obtain a cured product, except that the amount of the coloring agent (Art Pearl C800 Black) added was 2 parts by mass, and the amount of the partially polymerized substance of acrylic acid and 2-ethylhexyl acrylate added was 97 parts by mass.

As shown in Table 2, evaluation results were as follows: the degree of blackness (L value) of the cured product was 18.22; the amount of an unreacted monomer in the cured product was 0.59%; the state of aggregation of the coloring agent in the resin composition was ○; and the color appearance of the cured product was gray.

Comparative Example 4

The agitation, application and curing were performed in the same manner as in Example 1 to obtain a cured product, except that the coloring agent was changed to a coloring agent, Art Pearl GR-004BK, the amount of the coloring agent added was 7 parts by mass, and the amount of the partially polymerized substance of acrylic acid and 2-ethylhexyl acrylate added was 92 parts by mass.

As shown in Table 2, evaluation results were as follows: the degree of blackness (L value) of the cured product was 8.30; the amount of an unreacted monomer in the cured product was 1.30%; the state of aggregation of the coloring agent in the resin composition was ○; and the color appearance of the cured product was black.

Comparative Example 5

The agitation, application and curing were performed in the same manner as in Example 1 to obtain a cured product, except that the coloring agent was changed to a carbon black masterbatch, and the carbon black masterbatch was added so that the carbon black content in a formulation was 0.28 parts by mass. The carbon black masterbatch was obtained in such a manner that 3 parts by mass of carbon black (#95, manufactured by Mitsubishi Chemical Corporation) was added to 97 parts by mass of 2-ethylhexyl acrylate and dispersed using a bead mill.

As shown in Table 2, evaluation results were as follows: the degree of blackness (L value) of the cured product was 17.31; the amount of an unreacted monomer in the cured product was 1.08%; the state of aggregation of the coloring agent in the resin composition was ×; and the color appearance of the cured product was gray.

Comparative Example 6

The agitation, application and curing were performed in the same manner as in Example 1 to obtain a cured product, except that the same formulation as that of Comparative Example 5 was adopted and the agitation was performed for 30 minutes.

As shown in Table 2, evaluation results were as follows: the degree of blackness (L value) of the cured product was 9.82; the amount of an unreacted monomer in the cured product was 1.62%; the state of aggregation of the coloring agent in the resin composition was ×; and the color appearance of the cured product was black.

TABLE 1

|  | Example 1 | Example 2 | Example 3 | Example 4 | Example 5 | Example 6 |
|---|---|---|---|---|---|---|
| Amount of particles added (parts by mass) | 4 | 2 | 7 | 4 | 7 | 4 |
| Mean particle diameter (μm) | 6.5 | 3.8 | 6.5 | 2.5 | 15 | 6.5 |
| Pigment content in particle (%) | 7.5 | 37 | 7.5 | 18.0 | 7.5 | 7.5 |
| Pigment content in formulation (%) | 0.3 | 0.74 | 0.53 | 0.72 | 0.53 | 0.26 |
| CIE L * a * b L value | 9.10 | 8.80 | 8.50 | 8.92 | 9.50 | 9.88 |
| Loss in weight on heating (%) | 0.70 | 0.75 | 0.87 | 0.88 | 0.70 | 0.92 |
| Particle aggregation state | ○ | ○ | ○ | ○ | ○ | ○ |
| Color appearance | Black | Black | Black | Black | Black | Black |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Amount of particles added (parts by mass) | 4 | 8 | 2 | 7 | 0.28 | 0.28 |
| Mean particle diameter (μm) | 22 | 22 | 6.5 | 3.8 | — | — |
| Pigment content in particle (%) | 3.5 | 3.5 | 7.5 | 37 | (100) | (100) |
| Pigment content in formulation (%) | 0.14 | 0.28 | 0.15 | 2.59 | 0.28 | 0.28 |
| CIE L * a * b L value | 27.21 | 22.35 | 18.22 | 8.30 | 17.31 | 9.82 |
| Loss in weight on heating (%) | 0.63 | 0.68 | 0.59 | 1.30 | 1.08 | 1.62 |
| Particle aggregation state | ○ | ○ | ○ | ○ | X | X |
| Color appearance | Gray | Gray | Gray | Black | Gray | Black |

In Comparative Example 1, the black resin particles as a coloring agent have a large particle diameter and the pigment content in the formulation is small, and hence, coloring performance is not sufficient.

In Comparative Example 2, the amount of the black resin particles added was made larger than that in Comparative Example 1, whereby the carbon black content was increased, but, the particle diameter of the black resin particles is large, and accordingly, the degree of blackness was not sufficiently improved.

In Comparative Example 3, the particle diameter of the black resin particles and the amount of the black resin particles added are appropriate, but, the carbon black content in the formulation is small, and accordingly, the degree of blackness was lower.

In Comparative Example 4, the particle diameter of the black resin particles and the amount of the black resin particles added are appropriate, but, the carbon black content in the formulation is large, and accordingly, although the degree of blackness was improved, a UV light blocking effect was high and accordingly a large amount of an unreacted monomer remained.

In Comparative Examples 5 and 6, carbon black was used as a coloring agent, and therefore, the same agitation time as that in Example 1 was not enough for the dispersion, and accordingly, the dispersion needed to be performed for a longer time. Furthermore, in Comparative Examples 5 and 6, although the degree of blackness was improved, aggregates of carbon black were present in a size which allows the aggregates to be visually observed. Furthermore, the amount of the unreacted monomer was also larger than those in Examples 1 to 5 and Comparative Examples 1 to 3. This indicates that dispersed carbon black blocked UV light, or a reaction was inhibited by a functional group in the surface of the carbon black.

On the other hand, in each of Examples 1 to 5, black color dispersion can be sufficiently achieved with a low shearing force, and it can be said that the degree of blackness was sufficient and the appearance was also black. Furthermore, the amount of the unreacted monomer was small, and an adhesive layer having a sufficient degree of cure was attained. Furthermore, even in the case of Example 6, that is, in the case where the resin compositions are laminated and formed, an excellent degree of blackness was achieved.

REFERENCE SYMBOLS

11 . . . base material, 12 . . . adhesive layer, 13 . . . release material, 14A and 14B . . . adhesive layers, and 15 . . . base material layer.

The invention claimed is:

1. An adhesive composition comprising: an acrylic monomer; a photopolymerization initiator; and a coloring agent which has a mean volume particle diameter of not less than 1 μm and not more than 20 μm and in which a pigment is encapsulated in a resin,
   wherein the coloring agent is contained so that an amount of the pigment in the resin composition is not less than 0.25 wt % and not more than 1.0 wt %, and the resin in the coloring agent is made of urethane resin or acrylic resin, and
   the acrylic monomer is a partially polymerized substance of a (meth)acrylic acid alkyl ester monomer and a monomer capable of being copolymerized with the (meth)acrylic acid alkyl ester, or a combination of these monomers.

2. The adhesive composition according to claim 1, wherein an amount of the coloring agent in the resin composition is not less than 1 wt % and not more than 10 wt %.

3. The adhesive composition according to claim 1, wherein the pigment in the coloring agent is carbon black.

4. The adhesive composition according to claim 1, wherein the coloring agent is formed of resin particles having 5 to 40 wt % of carbon black encapsulated therein and made of the urethane resin or the acrylic resin.

5. The adhesive composition according to claim 1, wherein the acrylic monomer is a partially polymerized substance of acrylic acid and 2-ethylhexyl acrylate.

6. The adhesive composition according to claim 1, wherein the mean volume particle diameter is not less than 2 μm and not more than 15 μm.

7. The adhesive composition according to claim 1, wherein the amount of the pigment in the resin composition is not less than 0.3 wt % and not more than 0.8 wt %.

8. The adhesive composition according to claim 2, wherein the pigment in the coloring agent is carbon black.

9. The adhesive composition according to claim 2, wherein the coloring agent is formed of resin particles having 5 to 40 wt % of carbon black encapsulated therein and made of the urethane resin or the acrylic resin.

10. The adhesive composition according to claim 2, wherein the amount of the coloring agent in the resin composition is not less than 2 wt % and not more than 8 wt %.

11. An adhesive tape, having at least one layer formed by making a resin composition undergo a polymerization reaction, the resin composition comprising: an acrylic monomer; a photopolymerization initiator; and a coloring agent which has a mean volume particle diameter of not less than 1 μm and not more than 20 μm and in which a pigment is encapsulated in a resin,
   wherein the coloring agent is contained so that an amount of the pigment in the resin composition is not less than 0.25 wt % and not more than 1.0 wt %, and the resin in the coloring agent is made of urethane resin or acrylic resin, and
   the acrylic monomer is a partially polymerized substance of a (meth)acrylic acid alkyl ester monomer and a monomer capable of being copolymerized with the (meth)acrylic acid alkyl ester, or a combination of these monomers.

12. A method for producing an adhesive tape, comprising:
   applying a resin composition onto a base material, the resin composition comprising an acrylic monomer, a photopolymerization initiator, and a coloring agent which has a mean volume particle diameter of not less than 1 μm and not more than 20 μm and in which a pigment is encapsulated in a resin, wherein the coloring agent is contained so that an amount of the pigment in the resin composition is not less than 0.25 wt % and not more than 1.0 wt %, and the resin in the coloring agent is made of urethane resin or acrylic resin; and
   forming an adhesive layer on the base material by irradiating the resin composition with an active energy ray.

13. A method for producing an adhesive tape, comprising:
   forming an adhesive layer on a release material;
   applying a resin composition onto the adhesive layer, the resin composition comprising an acrylic monomer, a photopolymerization initiator, and a coloring agent which has a mean volume particle diameter of not less than 1 μm and not more than 20 μm and in which a pigment is encapsulated in a resin, wherein the coloring agent is contained so that an amount of the pigment in the resin composition is not less than 0.25 wt % and not more than 1.0 wt %, and the resin in the coloring agent is made of urethane resin or acrylic resin; and forming a base material layer on the adhesive layer by irradiating the resin composition with an active energy ray.

\* \* \* \* \*